July 19, 1949.  F. VON OPEL  2,476,339
FASTENING DEVICE
Original Filed Feb. 20, 1942
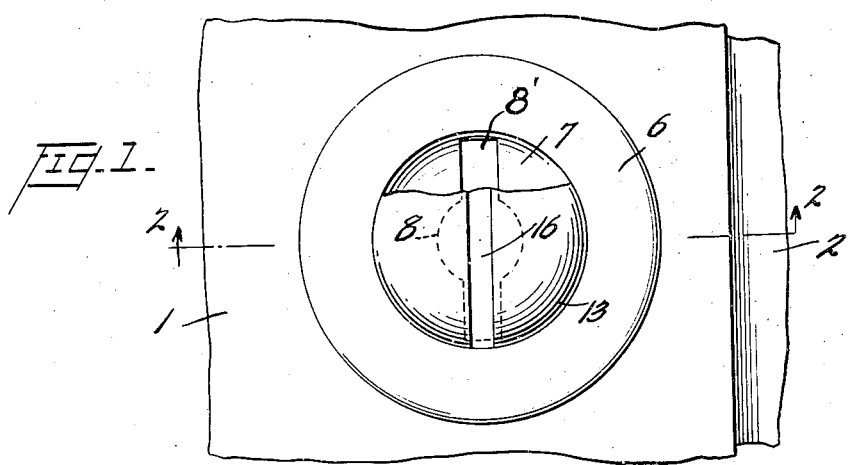
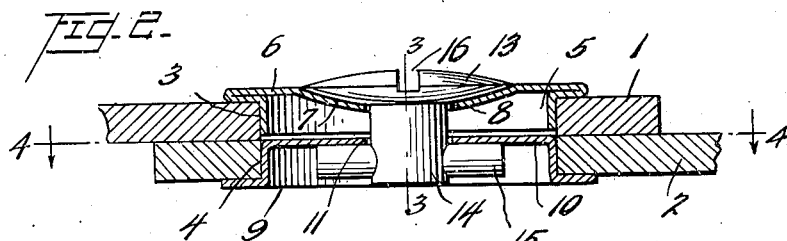
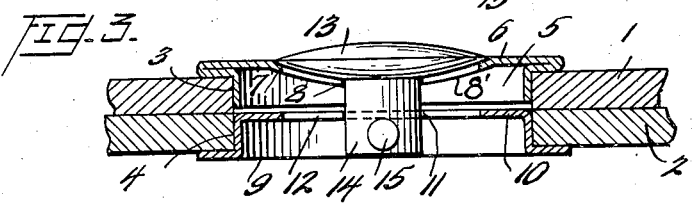
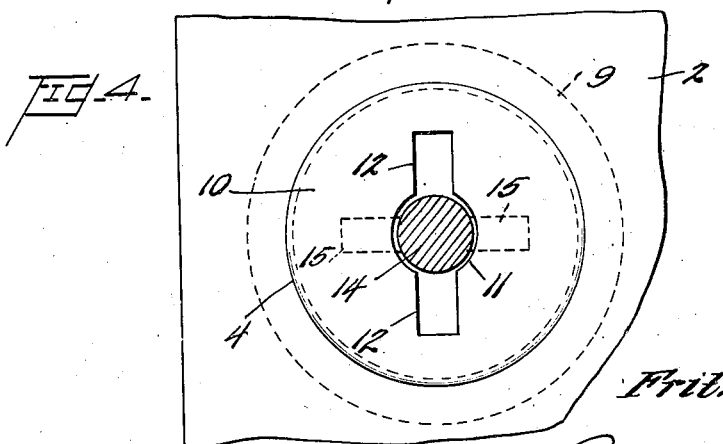
Inventor
Fritz von Opel,
By
Attorney.

Patented July 19, 1949

2,476,339

UNITED STATES PATENT OFFICE 2,476,339

FASTENING DEVICE

Fritz von Opel, Algiers, La., vested in the Attorney General of the United States Original application February 20, 1942, Serial No. 431,625, now Patent No. 2,373,722, April 17, 1945. Divided and this application March 24, 1945, Serial No. 584,599

8 Claims. (Cl. 24—221)

This invention relates to fastenings, in particular removable fastenings to join two or more objects which are substantially flat at the joint, such as plates or sheets of metal, laminated material, and the like, through substantially registering holes in them. This application is a division of Patent Number 2,373,722.

In particular the invention relates to removable fastenings for connecting a cover of any suitable shape with another object, such as a cowling with the edge of a man hole or filling-in orifice of another hollow body, such as a part of a wing or fuselage of an aircraft or the body of a vehicle.

More specifically the invention is concerned with removable fastenings for joining in a lap-joint two or more flat objects, such as plates or sheets of metal, laminated plastic material, and the like, which are accessible only from one side.

It is an object of the invention to simplify the manufacture of the elements and their mounting used for fastenings of this type. It is another object of the invention to use shapes for the elements of the fastening which can be easily produced in inexpensive mass production and mounted in holes of regular shape.

It is a further object of the invention to use in fastenings of this type an intermediary member comprising a springy portion engaged by the fastener proper, which can be easily manufactured in mass production and equally easily mounted in a hole of the object to be joined to another one.

It is still a further object of the invention to use a member in fastenings of the type herein concerned which is springy at least at the place where the fastener proper engages it, and countersunk or dished, so that the engaging parts of the fastener proper do not, or at least not considerably project beyond the outer surface of the member or of the object in which the member is mounted.

These and other objects of the invention will be more clearly understood when the specification proceeds with reference to the drawing.

In the drawing:

Fig. 1 is a top plan view of the improved fastener connecting two plates, a portion of the head of the fastener being broken away.

Fig. 2 is a vertical section on the line 2—2 of Fig. 1.

Fig. 3 is a vertical section on the line 3—3 of Fig. 2.

Fig. 4 is a horizontal section on the line 4—4 of Fig. 2.

As shown in the drawing the improved fastener connects two plates 1 and 2 which have holes 3 and 4, respectively, preferably of equal diameter. A member 5 is mounted in the hole 3, in any suitable manner as by a drive fit. The center portion 6 of the member 5 has a countersunk part 7 having a hole 8 and slots 8' extending from opposite sides of the hole 8. A member 9 is mounted in the hole 4, in a similar manner, and has a springy center portion 10 having a hole 11 and slots 12 extending from opposite sides of the hole 11. The fastener has a sunk head 13 fitting into the countersunk part 7, and a shank 14 provided with integral studs 15 projecting outwardly on opposite sides of the shank 14. The head 13 has a suitable kerf 16 in its upper face.

From the foregoing description of the details of construction of the device, its use and operation will be obvious. The members 5 and 9 are fitted into the holes 3 and 4 of the plates 1 and 2, in such a way that when the plates 1 and 2 are brought together so that the holes 3 and 4 register the slots 8' and 12 register. When the plates 1 and 2 are to be fastened together, the fastener is applied so that the studs 15 are passed through the slots 8' and 12, the shank 14 passing through the holes 8 and 11 of the members 5 and 9 respectively. Then the fastener is rotated by means of a suitable tool inserted into the kerf 16 of the head 13. Rotation through 90°, in either direction, moves the studs 15 from alignment with the slots 8' and 12, into the positions shown in the drawing, in which the studs 15 bear against the springy portion 10 of the member 9, the head 13 bearing on portion 7 of the member 5, thereby fastening or clamping the plates 1 and 2 together.

What is claimed is:

1. A fastening for joining two objects, such as plates or sheets, provided with holes which are aligned when the bodies are joined, substantially comprising a fastener essentially consisting of a head, shank and projections near the free end of said shank and extending from opposite sides thereof, and a pair of members, each provided with a hole and slots communicating therewith and extending from opposite sides to permit said shank and projections to pass therethrough, said members being mounted in the said holes of the objects to be joined, respectively, so that when said fastener is passed with its shank and projections through the holes and slots in said members, and is turned through an angle, it clamps said members together between said projections and said head.

2. A fastening for joining two objects, such as plates or sheets, provided with holes which are aligned when the bodies are joined, substantially comprising a fastener essentially consisting of a head, shank and projections near the free end of said shank and extending from opposite sides thereof, and a pair of members, each provided with a hole and slots communicating therewith and extending from opposite sides, to permit said shank and projections to pass therethrough, said members being mounted in the said holes of the objects to be joined, respectively, and one of said members having a springy center portion, so that when said fastener is passed with its shank and projections through the holes and slots in said members, and is turned through an angle, it clamps said objects together between said projections, and the said head, and the grip of said fastener between the adjacent surface portions of its projections and its head being such that resilient reactions are caused in the springy portion of one of said members in said clamping position of the fastener.

3. A fastening for joining two objects, such as plates or sheets, provided with holes which are aligned when the bodies are joined, substantially comprising a fastener essentially consisting of a head, shank and projections near the free end of said shank and extending from opposite sides thereof, a unitary disk-like member having a center portion provided with a hole and slots communicating therewith and extending from opposite sides to permit said shank and projections to pass therethrough, said member mounted in one of said holes in the objects to be joined, and a second unitary disk-like member having a center portion provided with a hole and slots communicating therewith and extending from opposite sides to permit said shank and projections to pass therethrough, said second member mounted in the other hole in the objects to be joined, so that when said fastener is passed with its shank and projections through the holes and slots in the said members, and is turned through an angle, it clamps said objects together between said projections and said head.

4. A fastening for joining two objects, such as plates or sheets, provided with holes which are aligned when the bodies are joined, substantially comprising a fastener essentially consisting of a head, shank and projections near the free end of said shank and extending from opposite sides thereof, a unitary disk-like member having a springy center portion provided with a hole and slots communicating therewith and extending from opposite sides to permit said shank and projections to pass therethrough, said member mounted in one of said holes in the objects to be joined, and a second unitary disk-like member having a center portion provided with a hole and slots communicating therewith and extending from opposite sides to permit said shank and projections to pass therethrough, said second member mounted in the other hole in the objects to be joined, so that when said fastener is passed with its shank and projections through the holes and slots in the said members, and is turned through an angle, it clamps said objects together between said projections and said head, and the grip of said fastener defined by the adjacent surface portions of its projections and its head is such that resilient reactions are caused in the said springy portion of the one of said members in said joining position of the fastener.

5. A fastening device for joining two flat bodies in face to face contact, said bodies having substantially coinciding openings therethrough when the bodies are joined, comprising a pair of disks secured in spaced relationship to each other over said openings to the non-contacting faces of said bodies respectively, one of said disks having a springy center portion and each of said disks provided with a hole axially alined with a second hole in the other disk, each hole having a slot extending radially therefrom; and a fastener comprising a head, a shank integral with said head, and a radially extending projection on said shank, the distance between the proximate surfaces of said projection and said head being slightly less than the distance between the opposite non-contacting faces of said disks, said holes and slots permitting said shank and projection to pass therethrough so that when said fastener is passed with its shank and projection through the holes and slots in said disks and is turned, the said head and projection exert pressure respectively on the outer non-contacting faces of the spaced disks to clamp the bodies.

6. A fastening device according to claim 5 wherein said disks are provided with countersunk portions surrounding the respective holes, said countersunk portions extending respectively into said body openings.

7. A fastening device for joining two bodies in face to face contact such as plates or sheets provided with alined openings when the bodies are joined, comprising a first springy disk, a second disk, each of said disks provided with a hole having slots extending radially therefrom; means on the first disk for anchoring the disk into the opening in one of said bodies; flange means on the second disk and extending into the opening in the other body from the non-contacting face of the latter toward the first disk, said flange means cooperating with said contacting bodies to maintain the pair of disks in spaced relation one with another; and a fastener comprising a head, a shank integral with said head, and projections near the smaller end of, and extending radially from said shank, said holes and slots permitting said shank and projections to pass therethrough, so that when said fastener is passed with its shank and projections through the holes and slots in said disks and is turned, the said head and projections exert pressure respectively on the spaced disks to clamp the bodies.

8. A fastening device according to claim 7 wherein said disks are provided with countersunk portions surrounding the respective holes, said countersunk portions extending respectively into said body openings.

FRITZ VON OPEL.

REFERENCES CITED

The following references are of record in the file of this patent:

UNITED STATES PATENTS

| Number | Name | Date |
|---|---|---|
| 245,320 | Rowe | Aug. 9, 1881 |
| 373,860 | Steffey | Nov. 29, 1887 |
| 1,857,530 | Dandridge et al. | May 10, 1932 |